US012045019B2

(12) United States Patent
Takasawa

(10) Patent No.: US 12,045,019 B2
(45) Date of Patent: Jul. 23, 2024

(54) AUSTENIZED FERRITIC STAINLESS STEEL, WATCH COMPONENT AND ELECTRIC WATCH

(71) Applicant: SEIKO EPSON CORPORATION, Tokyo (JP)

(72) Inventor: Koki Takasawa, Suwa (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/320,468

(22) Filed: May 19, 2023

(65) Prior Publication Data

US 2023/0288880 A1 Sep. 14, 2023

Related U.S. Application Data

(63) Continuation of application No. 17/118,775, filed on Dec. 11, 2020, now abandoned.

(30) Foreign Application Priority Data

Dec. 13, 2019 (JP) ................................ 2019-225195

(51) Int. Cl.

| | |
|---|---|
| ***G04R 60/06*** | (2013.01) |
| ***G04B 19/06*** | (2006.01) |
| ***G04B 37/22*** | (2006.01) |
| ***G04G 17/08*** | (2006.01) |
| ***G04G 21/02*** | (2010.01) |
| ***H01F 1/147*** | (2006.01) |
| ***H01F 1/34*** | (2006.01) |

(Continued)

(52) U.S. Cl.
CPC ............. *G04R 60/06* (2013.01); *G04B 19/06* (2013.01); *G04B 37/22* (2013.01); *G04G 17/08* (2013.01); *G04G 21/02* (2013.01); *H01F 1/147* (2013.01); *H01F 1/344* (2013.01); *H01Q 1/273* (2013.01); *H01Q 7/06* (2013.01); *C21D 2211/001* (2013.01)

(58) Field of Classification Search
CPC ........ G04R 60/06; G04B 19/06; G04B 37/22; G04G 17/08; G04G 21/02; H01F 1/147; H01F 1/344; H01Q 1/273; H01Q 7/06; C21D 2211/001
See application file for complete search history.

(56) References Cited

U.S. PATENT DOCUMENTS 8,303,168 B2 11/2012 Takasawa
2007/0217293 A1 9/2007 Takasawa
(Continued)

FOREIGN PATENT DOCUMENTS

JP 2016-125989 A 7/2016

*Primary Examiner* — Edwin A. Leon
(74) *Attorney, Agent, or Firm* — Harness, Dickey & Pierce, P.L.C.

(57) ABSTRACT

An austenized ferritic stainless steel includes a first region including a first soft magnetic layer composed of a ferrite phase, a first non-magnetic layer composed of an austenized phase in which the ferrite phase is austenized, and a first mixed layer in which the ferrite phase and the austenized phase are mixed, the first mixed layer being formed between the first soft magnetic layer and the first non-magnetic layer, and a second region including a second non-magnetic layer composed of the austenized phase, the second non-magnetic layer having a thickness greater than that of the first non-magnetic layer.

13 Claims, 11 Drawing Sheets

(51) Int. Cl.

| | |
|---|---|
| ***H01Q 1/27*** | (2006.01) |
| ***H01Q 7/06*** | (2006.01) |

(56) References Cited

U.S. PATENT DOCUMENTS

| | | | | |
|---|---|---|---|---|
| 2009/0073815 | A1 | 3/2009 | Takasawa | |
| 2012/0190321 | A1 * | 7/2012 | Sato | C22C 38/42<br>420/586.1 |

* cited by examiner

AUSTENIZED FERRITIC STAINLESS STEEL, WATCH COMPONENT AND ELECTRIC WATCH

The present application a continuation of U.S. patent application Ser. No. 17/118,775, filed Dec. 11, 2020, which is based on, and claims priority from JP Application Serial Number 2019-225195, filed Dec. 13, 2019, the disclosures of which are hereby expressly incorporated by reference herein in their entireties.

BACKGROUND

1. Technical Field

The present disclosure relates to a watch component and an electronic watch.

2. Related Art

JP-A-2016-125989 discloses a radio watch including a movement including a magnetic shield plate and a motor. In JP-A-2016-125989, the magnetic shield plate is disposed to overlap at least a portion of the motor in plan view of the movement in order to suppress the adverse influence of external magnetic fields on the motor. Further, in JP-A-2016-125989, an antenna core and the magnetic shield plate are disposed at a predetermined distance from each other in plan view in order to suppress a situation where radio waves are absorbed at the magnetic shield plate and the reception sensitivity of the antenna is reduced. Specifically, in JP-A-2016-125989, the magnetic shield plate is disposed such that the influence of external magnetic fields on the motor can be suppressed and that reduction in reception sensitivity of the antenna can be suppressed.

In JP-A-2016-125989, however, the number of components is disadvantageously increased since the magnetic shield plate is required to be provided, for components that can be influenced by external magnetic fields such as motors, in order to suppress the influence.

SUMMARY

A watch component of the present disclosure includes a first region including a first soft magnetic layer composed of a ferrite phase, a first non-magnetic layer composed of an austenized phase in which the ferrite phase is austenized, and a first mixed layer in which the ferrite phase and the austenized phase are mixed, the first mixed layer being formed between the first soft magnetic layer and the first non-magnetic layer, and a second region including a second non-magnetic layer composed of the austenized phase, the second non-magnetic layer having a thickness greater than that of the first non-magnetic layer.

A watch of the present disclosure includes the above-described watch component.

DESCRIPTION OF EXEMPLARY EMBODIMENTS

First Embodiment

An electronic watch 1 of a first embodiment of the present disclosure will be described below with reference to the drawings.

Figure 1:
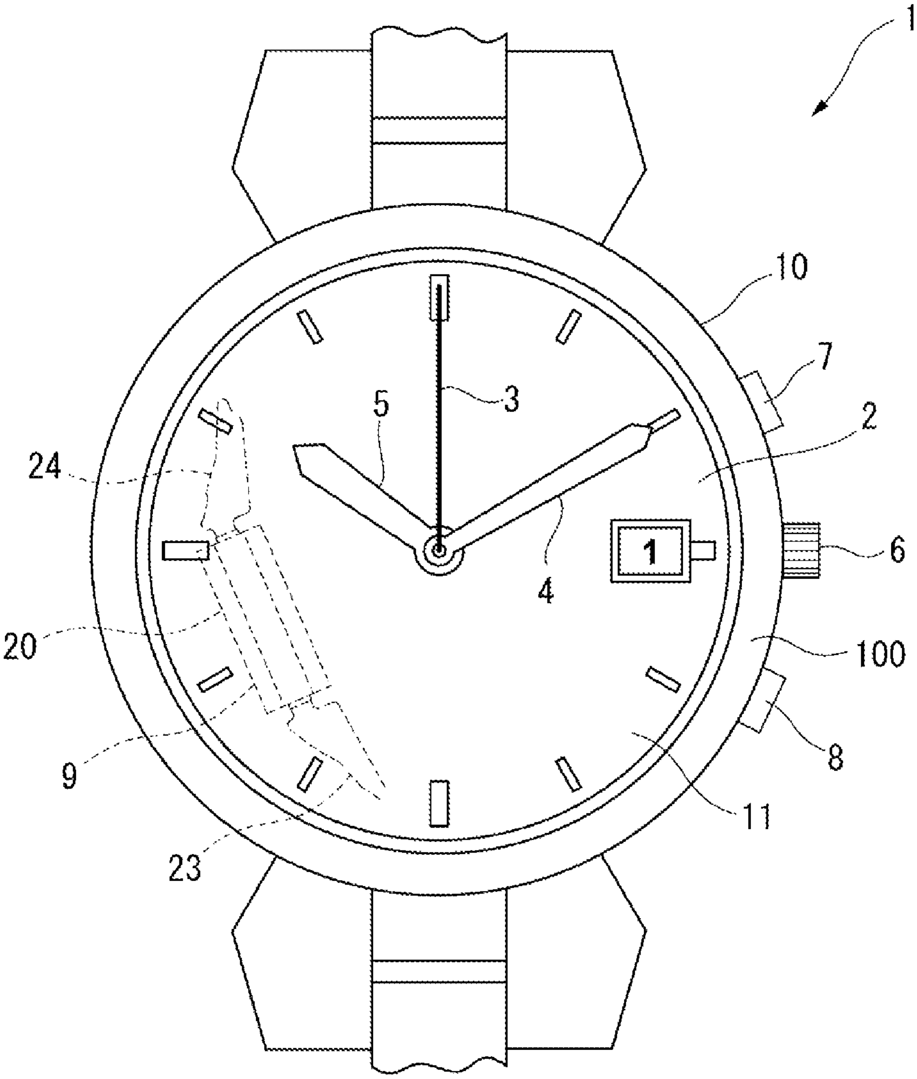
FIG. 1 is a front view illustrating an electronic watch of a first embodiment of the present disclosure.

FIG. 1 is a front view illustrating the electronic watch 1 of this embodiment. In this embodiment, the electronic watch 1 is configured as a wrist watch that is worn on the user's wrist.

As illustrated in FIG. 1, the electronic watch 1 includes a metal case 10. In addition, the case 10 includes a case body 100 formed in a substantially ring shape, a cover glass 11 mounted on a front surface side of the case body 100, and a case back (not illustrated) removably attached to the back surface side of the case body 100. Note that the case body 100 is an example of the watch component of the present disclosure.

In addition, the electronic watch 1 includes a disk-shaped dial 2, a second hand 3, a minute hand 4, an hour hand 5, a crown 6, an A-button 7 and a B-button 8, which are disposed inside the case 10.

In this embodiment, the electronic watch 1 is configured as a radio watch that can receive a long-wavelength standard radio wave as a radio wave including time information, and can correct the indication positions of the second hand 3, the minute hand 4 and the hour hand 5 on the basis of the received time information.

Figure 2:
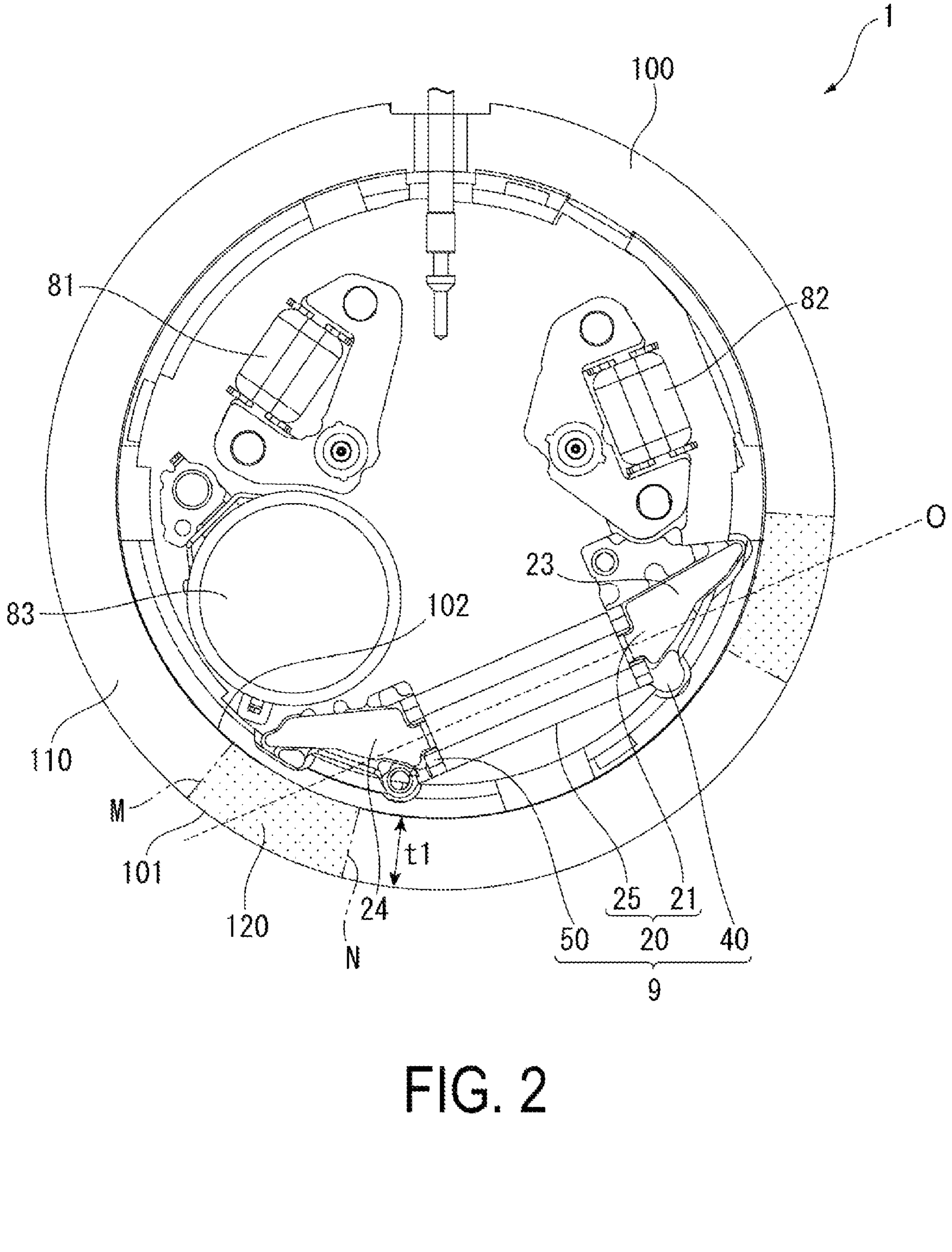
FIG. 2 is a plan view illustrating a main portion of the electronic watch of the first embodiment.

FIG. 2 is a plan view illustrating a main portion of the electronic watch 1. Specifically, the plan view illustrates a main portion of the electronic watch 1 in the state where the cover glass 11 and the dial 2 illustrated in FIG. 1 are removed.

As illustrated in FIG. 2, the antenna unit 9 is housed in the case body 100.

In addition, motors 81 and 82, a secondary battery 83, and a circuit board and a wheel train (not illustrated), and the like, are housed in the case body 100.

Antenna Unit

The antenna unit 9 includes an antenna 20, a first antenna frame 40, and a second antenna frame 50.

The antenna 20 is composed of an antenna core 21 and a coil 25 wound on the antenna core 21. That is, the antenna 20 is configured as a coil antenna.

In addition, in this embodiment, the antenna 20 is configured as a bar antenna in which the coil winding of the antenna core 21 is formed in a straight-line shape.

The antenna core 21 is, for example, a member obtained by die-cutting a cobalt-based amorphous metal foil as a magnetic foil material, or a member obtained by stacking, in the thickness direction of the electronic watch 1, 10 to 30 sheets formed by etching and then performing thermal treatment such as annealing to stabilize the magnetic properties. In addition, the antenna core 21 includes a first lead 23 and a second lead 24.

Note that a magnetic collecting plate may be attached to the surface of the first lead 23 and the second lead 24 in order to improve the reception performance of the antenna 20.

The magnetic collecting plate can be formed by laminating several magnetic foil members composed of amorphous sheets, for example. Examples of the magnetic foil member include a cobalt-based amorphous metal and an iron-based amorphous metal.

The first antenna frame 40 is a member made of a synthetic resin and is a member that holds the antenna core 21. As with the first antenna frame 40, the second antenna frame 50 is a member made of a synthetic resin and is a member that holds the antenna core 21.

That is, in this embodiment, the antenna core 21 is held by the first antenna frame 40 and the second antenna frame 50.

Case Body 100

Figure 3:
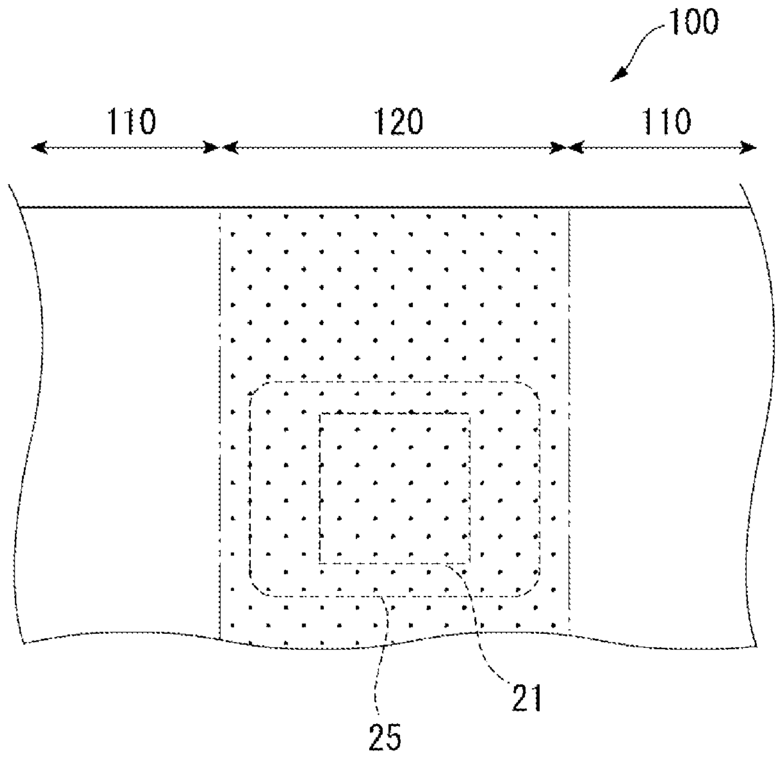
FIG. 3 is a side view of the electronic watch as viewed from an axial direction of an antenna.

FIG. 3 is a side view as viewed from an axial direction O of the antenna 20. Here, the axial direction O of the antenna 20 is the longitudinal direction of the antenna core 21, and refers to a direction orthogonal to the direction in which the directivity of radio wave reception is highest in the antenna 20.

As illustrated in FIGS. 2 and 3, the case body 100 is composed of an austenized ferritic stainless steel including a first region 110 and a second region 120. Note that, in this embodiment, the first region 110 and the second region 120 are regions ranging from a first surface 101, which is the outer surface, to a second surface 102, which is the inner surface opposite the first surface 101, in the case body 100 as illustrated in FIG. 2. That is, the second region 120 is a region defined by virtual lines M and N, the first surface 101, and the second surface 102 illustrated in FIG. 2 in the case body 100. In this embodiment, as the second region 120, two regions are disposed along the axial direction O on the opposite sides with the antenna 20 therebetween. The first region 110 is the region other than the second region 120 in the case body 100.

The first region 110 is a region that has magnetic resistance and blocks external magnetic fields and the like in the case body 100. Thus, in the case body 100, the motors 81 and 82, the secondary battery 83 and the like disposed at positions corresponding to the first region 110 are less influenced by external magnetic fields.

The second region 120 is a region configured to be able to transmit radio waves such as a long-wavelength standard radio wave in the case body 100. It is disposed at a position overlapping the antenna 20 in a side view as viewed from the axial direction O of the antenna 20 as illustrated in FIG. 3 in this embodiment. In addition, the second region 120 is configured to have a cross-sectional area greater than that of the antenna core 21 in the side view.

In this manner, in this embodiment, the case body 100 includes the first region 110 configured to block external magnetic fields and the like and the second region 120 configured to be able to transmit radio waves.

First Region

Figure 4:
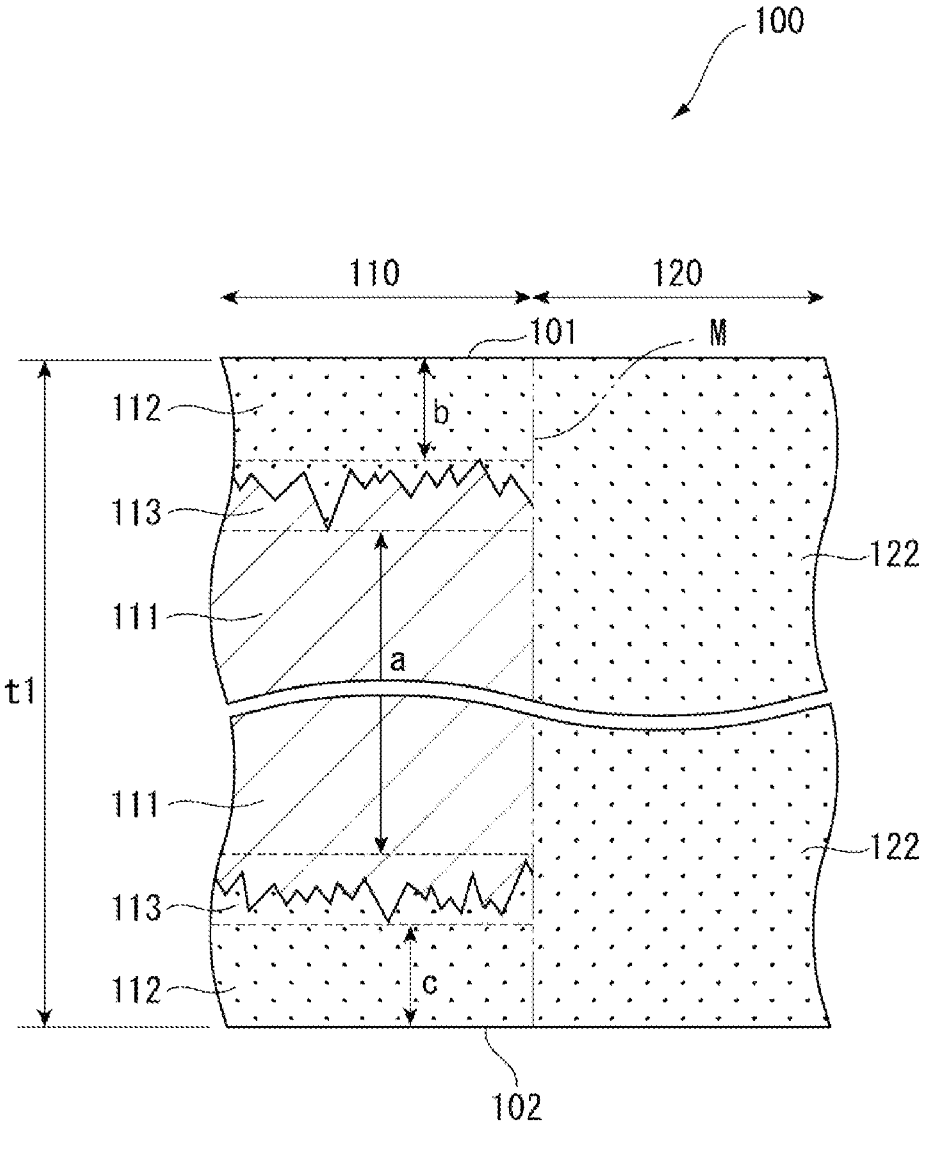
FIG. 4 is a cross-sectional view illustrating a main portion of a case body according to the first embodiment.

FIG. 4 is a cross-sectional view of a main portion of the case body 100 taken along a direction parallel to the dial 2. Note that FIG. 4 illustrates an enlarged view of the first region 110 and the second region 120 disposed with the virtual line M therebetween in FIG. 2 in the case body 100.

As illustrated in FIG. 4, the first region 110 of the case body 100 includes a first soft magnetic layer 111 composed of a ferrite phase, and a first non-magnetic layer 112 composed of an austenite phase in which the ferrite phase is austenized (hereinafter referred to as "austenized phase"), and a first mixed layer 113 in which the ferrite phase and the austenized phase are mixed between the first soft magnetic layer 111 and the first non-magnetic layer 112.

In this embodiment, the first non-magnetic layer 112 and the first mixed layer 113 are provided on the first surface 101 side with respect to the first soft magnetic layer 111. Further, the first non-magnetic layer 112 and the first mixed layer 113 are provided also on the second surface 102 side with respect to the first soft magnetic layer 111. In other words, the first soft magnetic layer 111 is provided between the first mixed layers 113 in the thickness direction of the case body 100. The first mixed layers 113 are provided between the first soft magnetic layer 111 and the first non-magnetic layers 112. In other words, in the direction from the first surface 101 side toward the second surface 102 side, the first non-magnetic layer 112, the first mixed layer 113, the first soft magnetic layer 111, the first mixed layer 113, and the first non-magnetic layer 112 are stacked in this order.

In addition, as illustrated in FIGS. 2 and 4, each of the first region 110 and the second region 120 has a thickness of t1. In other words, the first region 110 and the second region 120 are configured to have thicknesses equal to each other. Note that the thickness t1 of the first region 110 and the second region 120, i.e., the thickness t1 of the case body 100, is approximately 4 mm, for example.

First Soft Magnetic Layer

As described above, the first soft magnetic layer 111 is composed of a ferrite phase. In this manner, the first soft magnetic layer 111 has magnetic resistance.

In this embodiment, the first soft magnetic layer 111 is composed of a ferritic stainless steel that contains, by mass %, 18 to 22% Cr, 1.3 to 2.8% Mo, 0.05 to 0.50% Nb, 0.1 to 0.8% Cu, less than 0.5% Ni, less than 0.8% Mn, less than 0.5% Si, less than 0.10% P, less than 0.05% S, less than 0.05% N, and less than 0.05% C, with the remainder composed of Fe and unavoidable impurities. Note that the first soft magnetic layer 111 is not limited to the above-described configuration as long as the first soft magnetic layer 111 is composed of a ferrite phase.

In addition, in this embodiment, the first region 110 is configured such that the first soft magnetic layer 111 has a thickness a of 100 μm or greater. In this manner, the first region 110 has a predetermined magnetic resistance required as a watch.

First Non-Magnetic Layer

The first non-magnetic layer 112 is formed by subjecting the base material forming the first soft magnetic layer 111 to a nitrogen absorption treatment such that the ferrite phase is austenized.

In this embodiment, a thickness b of the first non-magnetic layer 112 provided on the first surface 101 side is set to approximately 350 μm, and a thickness c of the first non-magnetic layer 112 provided on the second surface 102 side is set to approximately 350 μm. In other words, in this embodiment, the first region 110 is configured such that the thickness b of the first non-magnetic layer 112 provided on the first surface 101 side and the thickness c of the first non-magnetic layer 112 provided on the second surface 102 side are substantially equal to each other.

Note that the thicknesses b and c of the first non-magnetic layers 112 are the thicknesses of the layers composed of the austenized phase, and are the shortest distances from the first surface 101 or the second surface 102 to the ferrite phase of the first mixed layer 113 in the field of view in SEM observation at a magnification of 500 to 1000. Alternatively, they are the austenized phases closest from the first surface 101 or the second surface 102. In addition, the thickness of the first non-magnetic layer 112 may be set to an average value of the distances measured at a plurality of points where the distance from the first surface 101 or the second surface 102 to the ferrite phase is short.

In addition, in this embodiment, the content of nitrogen in the first non-magnetic layer 112 is 1.0 to 1.6% by mass %.

Note that the first non-magnetic layer 112 is not limited to the above-described configuration. For example, the first non-magnetic layer 112 may be configured to have a thickness of 350 μm or greater, or may be configured to have a thickness of 350 μm or smaller as long as the first non-magnetic layer 112 is provided in accordance with the hardness and corrosion resistance required as a watch.

First Mixed Layer

The first mixed layer 113 is formed by a variation in the transfer rate of nitrogen entering the first soft magnetic layer 111 composed of the ferrite phase in the process of forming the first non-magnetic layer 112. Specifically, at the portion where the transfer rate of nitrogen is high, nitrogen enters into a deep portion in the ferrite phase to austenize it, whereas at a portion where the transfer rate of nitrogen is low, the ferrite phase is austenized only in a shallow portion, and thus, the first mixed layer 113 in which the ferrite phase and the austenized phase are mixed with respect to the depth direction is formed. Note that the first mixed layer 113 is a layer including the shallowest part to the deepest part of the austenized phase in a cross-sectional view, and is a layer thinner than the first non-magnetic layer 112.

Second Region

The second region 120 is composed of a second non-magnetic layer 122 composed of an austenized phase. Specifically, in the second region 120, the second non-magnetic layer 122 is formed from the first surface 101, which is the outer surface, to the second surface 102, which is the inner surface, in the case body 100. In this manner, the second region 120 is configured to be able to transmit radio waves such as a long-wavelength standard radio wave.

Second Non-Magnetic Layer

As with the above-described first non-magnetic layer 112, the second non-magnetic layer 122 is formed by performing a nitrogen absorption treatment such that the ferrite phase is austenized.

Here, in this embodiment, the second non-magnetic layer 122 is provided from the first surface 101 to the second surface 102 in the case body 100 as described above. That is, there is no layer composed of a ferrite phase in the second region 120. As such, the thickness of the second non-magnetic layer 122 is greater than that of the first non-magnetic layer 112.

In addition, in this embodiment, the content of nitrogen in the second non-magnetic layer 122 is 1.0 to 1.6% by mass % as with the above-described first non-magnetic layer 112.

Manufacturing Method of Case Body

Next, a manufacturing method of the case body 100 will be described.

Figure 5:
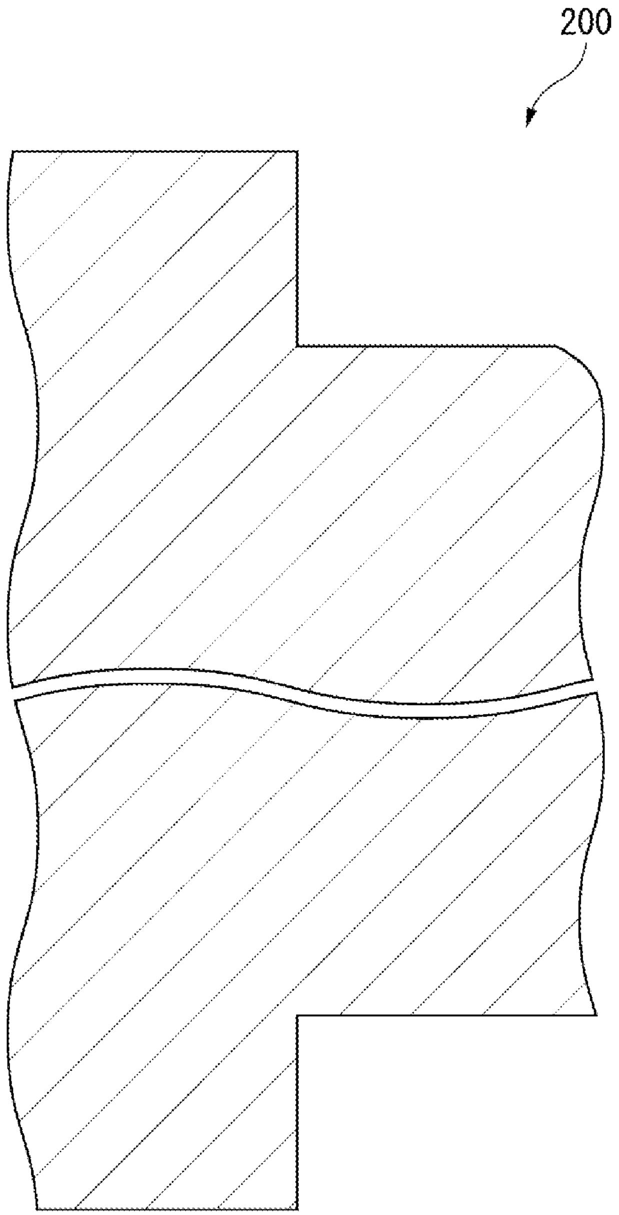
FIG. 5 is a schematic diagram illustrating a manufacturing process of the case body of the first embodiment.
Figure 6:
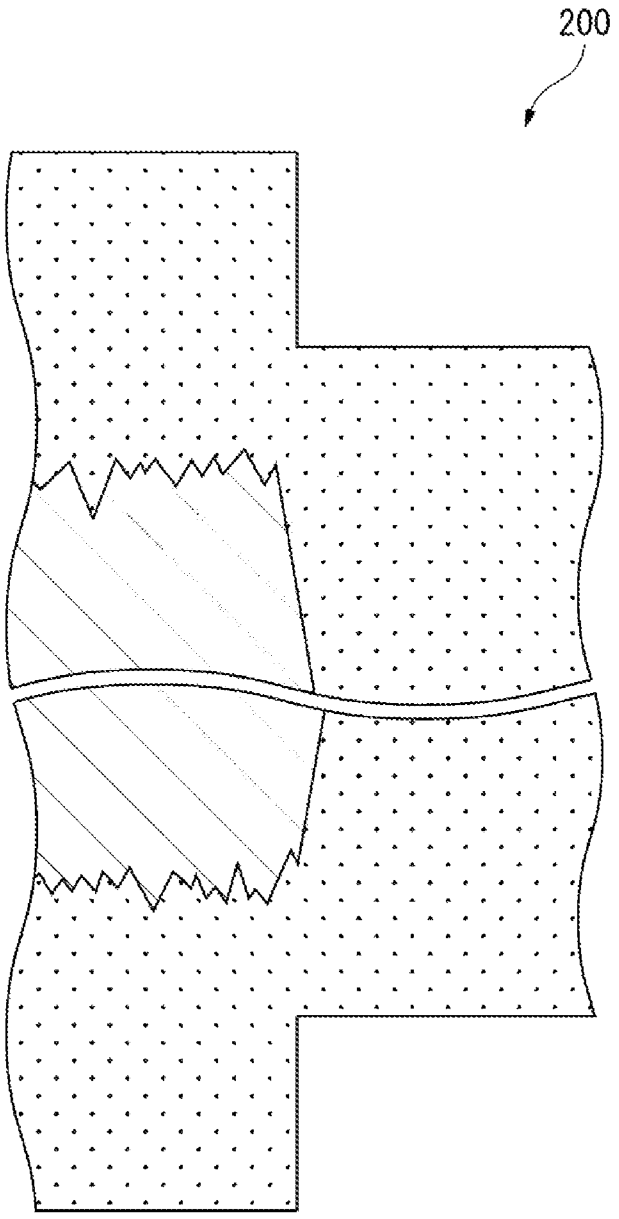
FIG. 6 is a schematic diagram illustrating a manufacturing process of the case body of the first embodiment.
Figure 7:
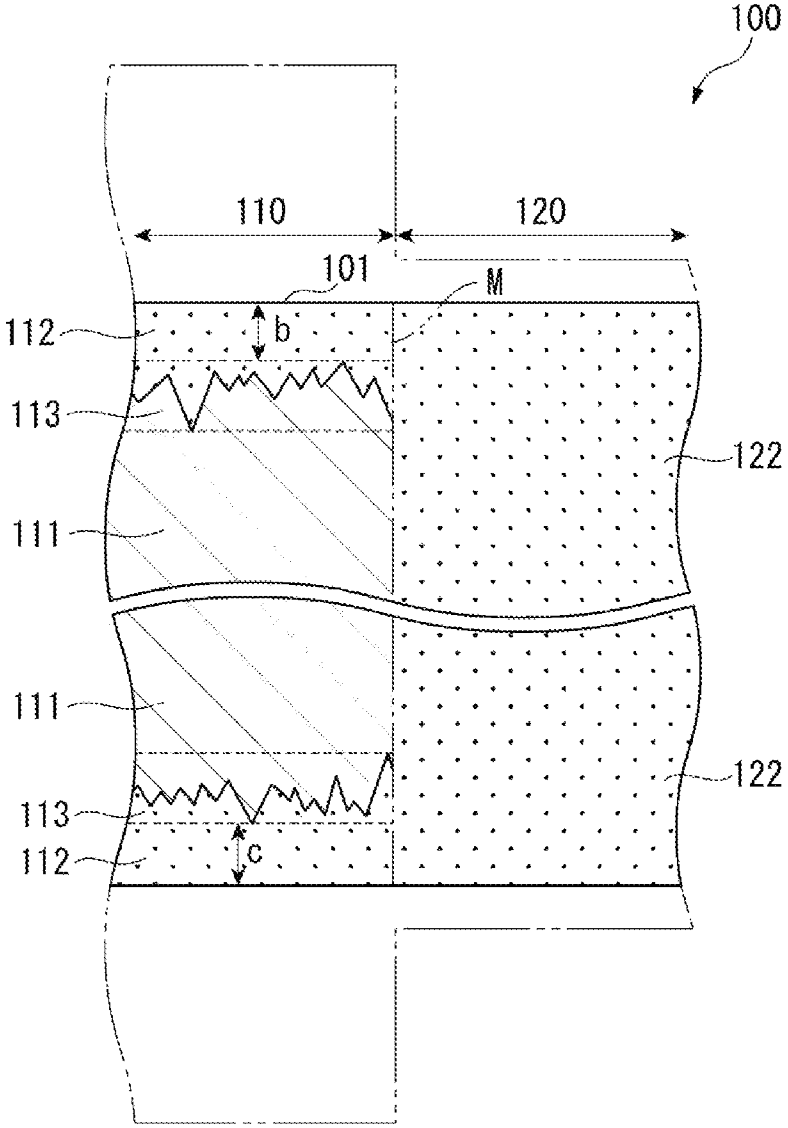
FIG. 7 is a schematic diagram illustrating a manufacturing process of the case body of the first embodiment.

FIGS. 5 to 7 are schematic views illustrating manufacturing processes of the case body 100.

As illustrated in FIG. 5, first, a ferritic stainless steel is machined to form a base material 200. At this time, the base material 200 is formed such that the thickness of the portion corresponding to the first region 110 is greater than that of the portion corresponding to the second region 120 by a predetermined length.

Next, as illustrated in FIG. 6, a nitrogen absorption treatment is performed on the base material 200 machined in the above-mentioned manner. As a result, nitrogen enters the base material 200 from the surface, and the ferrite phase is austenized. At this time, in the portion corresponding to the first region 110, nitrogen does not completely enter the portion in the nitrogen absorption treatment and the ferrite phase remains by a predetermined thickness since the base material 200 is formed such that the thickness of the portion is greater than that of the portion corresponding to the second region 120. On the other hand, nitrogen enters the portion corresponding to the second region 120 across the entire layer, and the ferrite phase is austenized. In other words, the nitrogen absorption treatment of this embodiment is performed such that nitrogen enters the portion corresponding to the second region 120 across the entire layer.

Finally, as illustrated in FIG. 7, the surface side of the base material 200 is cut by a predetermined length and thus the case body 100 as described above is formed. Specifically, in this embodiment, the surface side of the base material 200 is cut such that the thicknesses b and c of the first non-magnetic layers 112 are approximately 350 μm in the first region 110. In this manner, the case body 100 can achieve the hardness and corrosion resistance required as a watch.

Advantageous Effects of First Embodiment

According to the first embodiment, the following effects can be achieved.

The case body 100 of this embodiment includes the first region 110 including the first soft magnetic layer 111 composed of a ferrite phase, the first non-magnetic layer 112 composed of an austenized phase, and the first mixed layer 113 in which the ferrite phase and the austenized phase are mixed between the first soft magnetic layer 111 and the first non-magnetic layer 112. Further, the case body 100 includes the second region 120 including the second non-magnetic layer 122 composed of an austenized phase with a thickness greater than that of the first non-magnetic layer 112.

In this manner, in the second region 120, the thickness of the second non-magnetic layer 122 composed of the austenized phase capable of transmitting radio waves can be increased, and thus transmission of radio waves such as a long-wavelength standard radio wave can be facilitated. Further, in this embodiment, the second region 120 is composed only of the second non-magnetic layer 122 composed of the austenized phase, that is, the second region 120 includes no ferrite phase, and thus transmission of radio waves such as a long-wavelength standard radio wave can be further facilitated.

In addition, since the first region 110 includes the first soft magnetic layer 111 composed of the ferrite phase, magnetic resistance can be achieved. That is, in this embodiment, with only a single component as the case body 100, both the improvement in radio wave reception sensitivity and the improvement in magnetic resistance can be achieved and the need for a magnetic shield plate and the like can be eliminated, and thus, the number of components can be reduced. Note that while a configuration in which the second region 120 includes no ferrite phase is described above, it is also possible to adopt a configuration in which the ferrite phase remains in the second region 120 without forming a layer. In this case, when the ferrite phase remaining in the second region 120 is sufficiently smaller than the ferrite phase of the first region 110, the above-described effect can be achieved.

In this embodiment, the first soft magnetic layer 111 has a thickness a of 100 μm or greater.

In this manner, in the first region 110, a predetermined magnetic resistance required as a watch can be achieved.

In this embodiment, the thickness of the first region 110 and the thickness of the second region 120 are equal to each other.

In this manner, in the manufacturing process of the case body 100, the first region 110 and the second region 120 can be simultaneously cut, and thus the ease of the manufacturing of the case body 100 can be increased.

In this embodiment, the electronic watch 1 includes the antenna 20 including the antenna core 21, and the second region 120 is disposed at a position overlapping the antenna 20 in a side view from the axial direction O of the antenna 20. Further, in the above-described side view, the area of the second region 120 is larger than the cross-sectional area of the antenna core 21.

In this manner, the reception sensitivity of the antenna 20 for receiving radio waves such as a long-wavelength standard radio wave transmitted through the second region 120 of the case body 100 can be increased.

Second Embodiment

Next, a second embodiment will be described with reference to FIG. 8.

The second embodiment differs from the above-described first embodiment in that a second soft magnetic layer 121A and a second mixed layer 123A are formed in a second region 120A.

Note that the same configurations as those of the case body 100 of the first embodiment are denoted by the same reference signs, and description thereof will be omitted.

Figure 8:
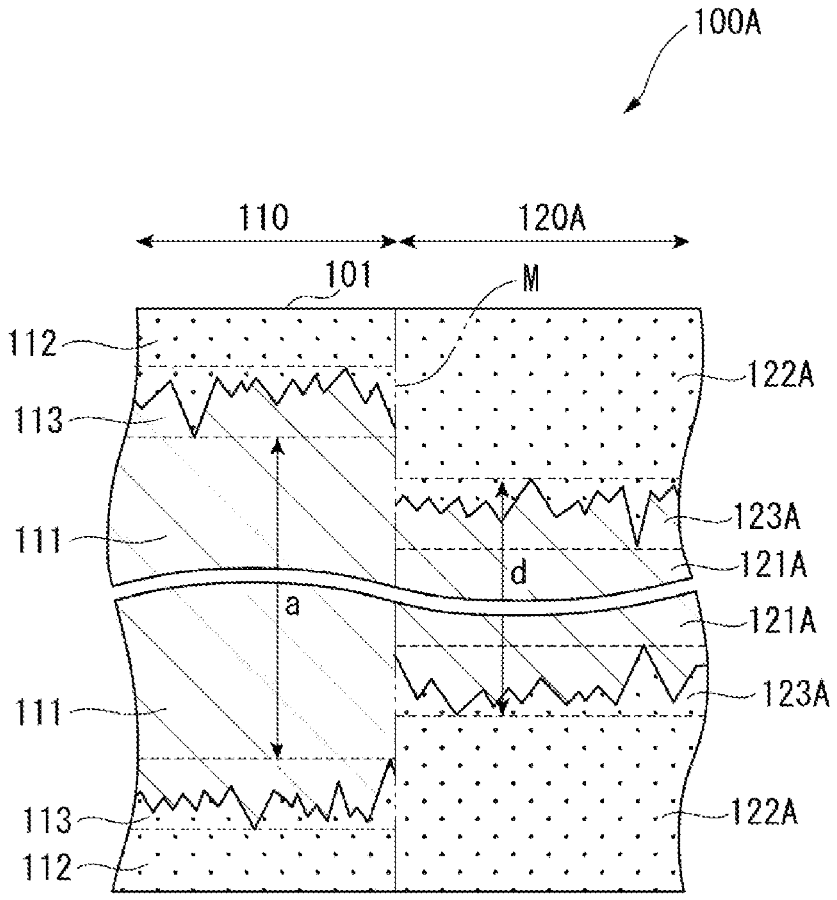
FIG. 8 is a cross-sectional view illustrating a main portion of a case body of a second embodiment.

FIG. 8 is a cross-sectional view illustrating a main portion of a case body 100A of the second embodiment.

As illustrated in FIG. 8, the second region 120A of the case body 100A includes the second soft magnetic layer 121A composed of a ferrite phase, a second non-magnetic layer 122A composed of an austenized phase, and the second mixed layer 123A in which the ferrite phase and the austenized phase are mixed between the second soft magnetic layer 121A and the second non-magnetic layer 122A.

As with the second non-magnetic layer 122 of the above-described first embodiment, the second non-magnetic layer 122A is provided by austenizing the ferrite phase such that the content of nitrogen is 1.0 to 1.6% by mass %. In addition, as in the above-described first embodiment, the thickness of the second non-magnetic layer 122A is greater than that of the first non-magnetic layer 112.

The second soft magnetic layer 121A is composed of a ferritic stainless steel similar to that of the first soft magnetic layer 111 of the above-described first embodiment.

In addition, as with the first mixed layer 113 of the above-described first embodiment, the second mixed layer 123A is formed by a variation in the transfer rate of nitrogen entering the second soft magnetic layer 121A composed of a ferrite phase, and is formed as a mixture of the ferrite phase and the austenized phase with respect to the depth direction.

In addition, in this embodiment, the second region 120A is configured such that a thickness d of a combination of the second soft magnetic layer 121A and the second mixed layer 123A is smaller than the thickness a of the first soft magnetic layer 111 of the first region 110, and is 100 μm or smaller.

In this manner, the thickness of the second soft magnetic layer 121A and the second mixed layer 123A including the ferrite phase capable of absorbing radio waves can be reduced, and thus the influence on the reception sensitivity of the antenna 20 can be reduced.

As described above, in the second region 120A of this embodiment, the second non-magnetic layer 122A is not formed across the entire layer of the case body 100A in the nitrogen absorption treatment, and the second soft magnetic layer 121A and the second mixed layer 123A partially remain unlike in the above-described first embodiment. Specifically, in this embodiment, the nitrogen absorption treatment is performed such that the entry depth of nitrogen is smaller than in the above-described first embodiment.

Advantageous Effects of Second Embodiment

According to the second embodiment, the following effects can be achieved.

In this embodiment, the second region 120A includes the second soft magnetic layer 121A composed of a ferrite phase, and the second mixed layer 123A in which the ferrite phase and the austenized phase are mixed between the second soft magnetic layer 121A and the second non-magnetic layer 122A.

In this manner, when the second non-magnetic layer 122A is formed by the nitrogen absorption treatment, the entry depth of nitrogen can be reduced, and thus the treatment time of the nitrogen absorption treatment can be reduced.

In this embodiment, the thickness d of the combination of the second soft magnetic layer 121A and the second mixed layer 123A is 100 μm or smaller.

In this manner, the influence on the reception sensitivity of the antenna 20 can be reduced.

Third Embodiment

Next, a third embodiment will be described with reference to FIG. 9.

The third embodiment differs from the above-described first embodiment in that in a first region 110B, a thickness e of a first non-magnetic layer 112B provided on the first surface 101 side is greater than a thickness f of the first non-magnetic layer 112B provided on the second surface 102 side.

Note that the same configurations as those of the case body 100 of the first embodiment are denoted by the same reference signs, and description thereof will be omitted.

Figure 9:
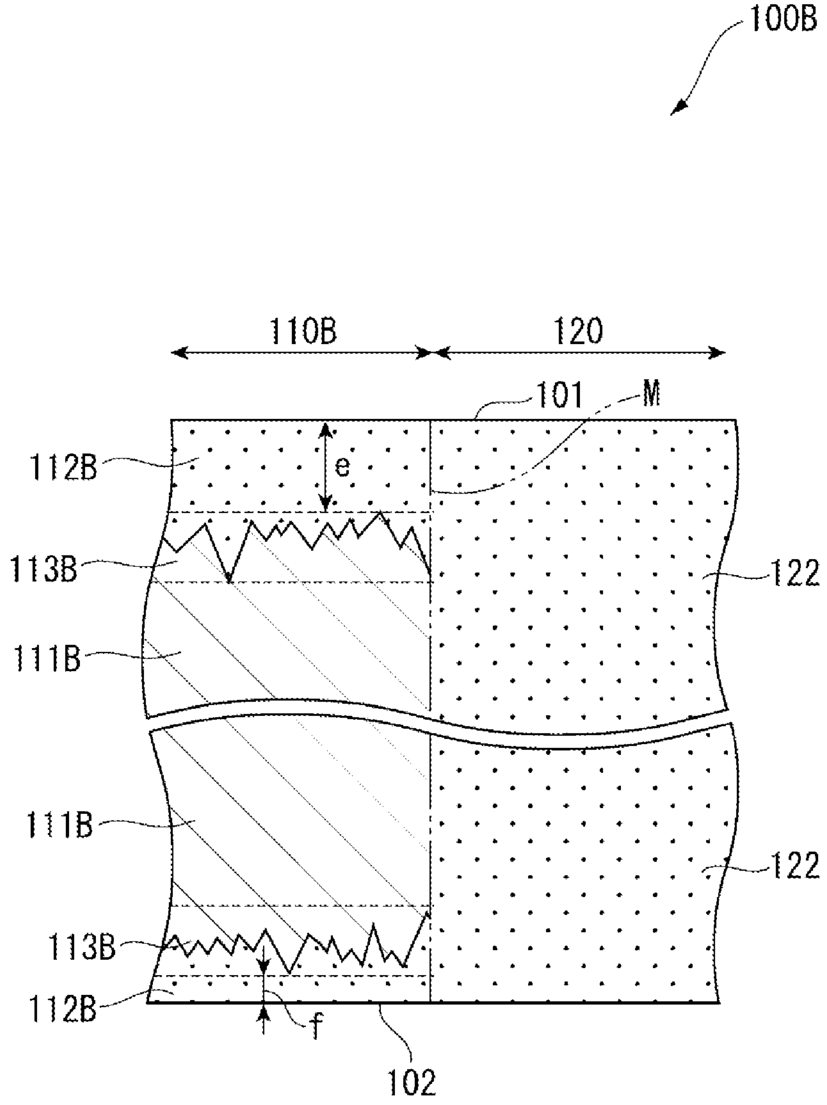
FIG. 9 is a cross-sectional view illustrating a main portion of a case body of a third embodiment.

FIG. 9 is a cross-sectional view illustrating a main portion of a case body 100B of the third embodiment.

As illustrated in FIG. 9, the first region 110B of the case body 100B includes a first soft magnetic layer 111B composed of a ferrite phase, the first non-magnetic layer 112B composed of an austenized phase, and a first mixed layer 113B in which the ferrite phase and the austenized phase are mixed between the first soft magnetic layer 111B and the first non-magnetic layer 112B.

In this embodiment, the first region 110B is configured such that the thickness e of the first non-magnetic layer 112B provided on the first surface 101 side is greater than the thickness f of the first non-magnetic layer 112B provided on the second surface 102 side. Specifically, the thickness e of the first non-magnetic layer 112B provided on the first surface 101 side is approximately 350 μm, and the thickness f of the first non-magnetic layer 112B provided on the second surface 102 side is approximately 100 μm.

In this manner, the first non-magnetic layer 112B having a sufficient thickness is provided on the first surface 101 side, which is the outer side of the case body 100B, and thus the hardness and corrosion resistance required as a watch can be achieved. On the other hand, the thickness of the first non-magnetic layer 112B can be reduced on the second surface 102 side, which is the inner side of the case body 100B, and thus the inner space of the case body 100B can be increased. In this manner, the freedom of the arrangement of components such as the motors 81 and 82, the secondary battery 83, and the like can be increased, and the size of the electronic watch 1 can be reduced.

Advantageous Effects of Third Embodiment

According to the third embodiment, the following effects can be achieved.

In this embodiment, the first region 110B includes the first surface 101 and the second surface 102 located opposite the first surface 101, and the thickness e of the first non-magnetic layer 112B provided on the first surface 101 side is greater than the thickness f of the first non-magnetic layer 112B provided on the second surface 102 side.

In this manner, the hardness and corrosion resistance required as a watch can be achieved, and the inner space of the case body 100B can be increased. Thus, the degree of freedom of the arrangement of components such as the motors 81 and 82 and the secondary battery 83 can be increased, and the size of the electronic watch 1 can be reduced.

Fourth Embodiment

Next, a fourth embodiment will be described with reference to FIG. 10.

The fourth embodiment differs from the above-described first embodiment in that the thickness of a first region 110C and the thickness of a second region 120C differ from each other in a case body 100C.

Note that the same configurations as those of the case body 100 of the first embodiment are denoted by the same reference signs, and description thereof will be omitted.

Figure 10:
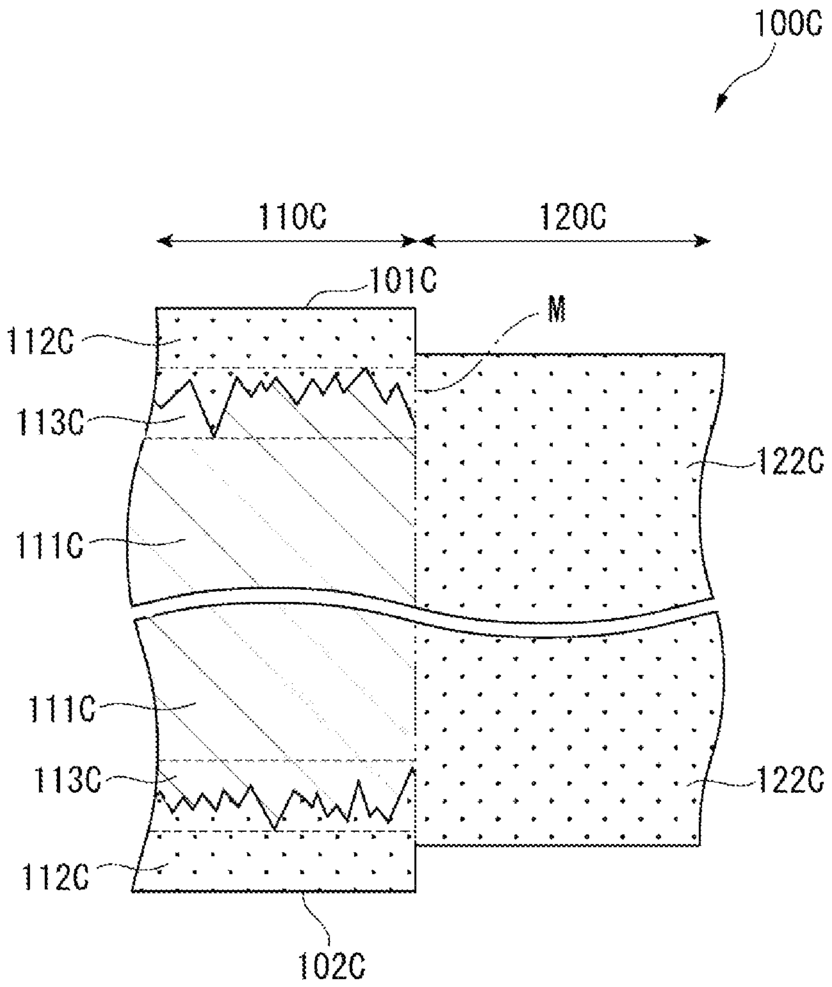
FIG. 10 is a cross-sectional view illustrating a main portion of a case body of a fourth embodiment.

FIG. 10 is a cross-sectional view illustrating a main portion of the case body 100C of the fourth embodiment.

As illustrated in FIG. 10, the case body 100C includes the first region 110C and the second region 120C.

As in the above-described first embodiment, the first region 110C includes a first soft magnetic layer 111C, a first non-magnetic layer 112C, and a first mixed layer 113C. In addition, the second region 120C includes a second non-magnetic layer 122C as in the above-described first embodiment.

Here, in this embodiment, the case body 100C is configured such that the thickness of the first region 110C and the thickness of the second region 120C are different from each other.

Specifically, in the second region 120C, a first surface 101C side and a second surface 102C side are cut more than in the first region 110C, and a step is formed in the first surface 101C and the second surface 102C. In other words, in this embodiment, the second region 120C is formed to have a thickness smaller than that of the first region 110C. In this manner, in transmission of radio waves such as a long-wavelength standard radio wave through the second region 120C, the distance of the portion for transmission through the first region 110C is reduced, and thus the attenuation of the radio waves can be reduced.

Advantageous Effects of Fourth Embodiment

According to the fourth embodiment, the following effects can be achieved.

In this embodiment, the thickness of the first region 110C and the thickness of the second region 120C are different from each other. Specifically, the second region 120C are provided so as to have a thickness smaller than that of the first region 110C.

In this manner, the attenuation of radio waves such as a long-wavelength standard radio wave can be reduced, and thus the reception sensitivity of the antenna 20 can be further improved.

Fifth Embodiment

Next, a fifth embodiment will be described below with reference to FIG. 11.

The fifth embodiment differs from the above-described first embodiment in that a first region 110D is not disposed in a predetermined range from a center 61D of a magnetic sensor 60D in a case body 100D.

Note that the same configurations as those of the case body 100 of the first embodiment are denoted by the same reference signs, and description thereof will be omitted.

Figure 11:
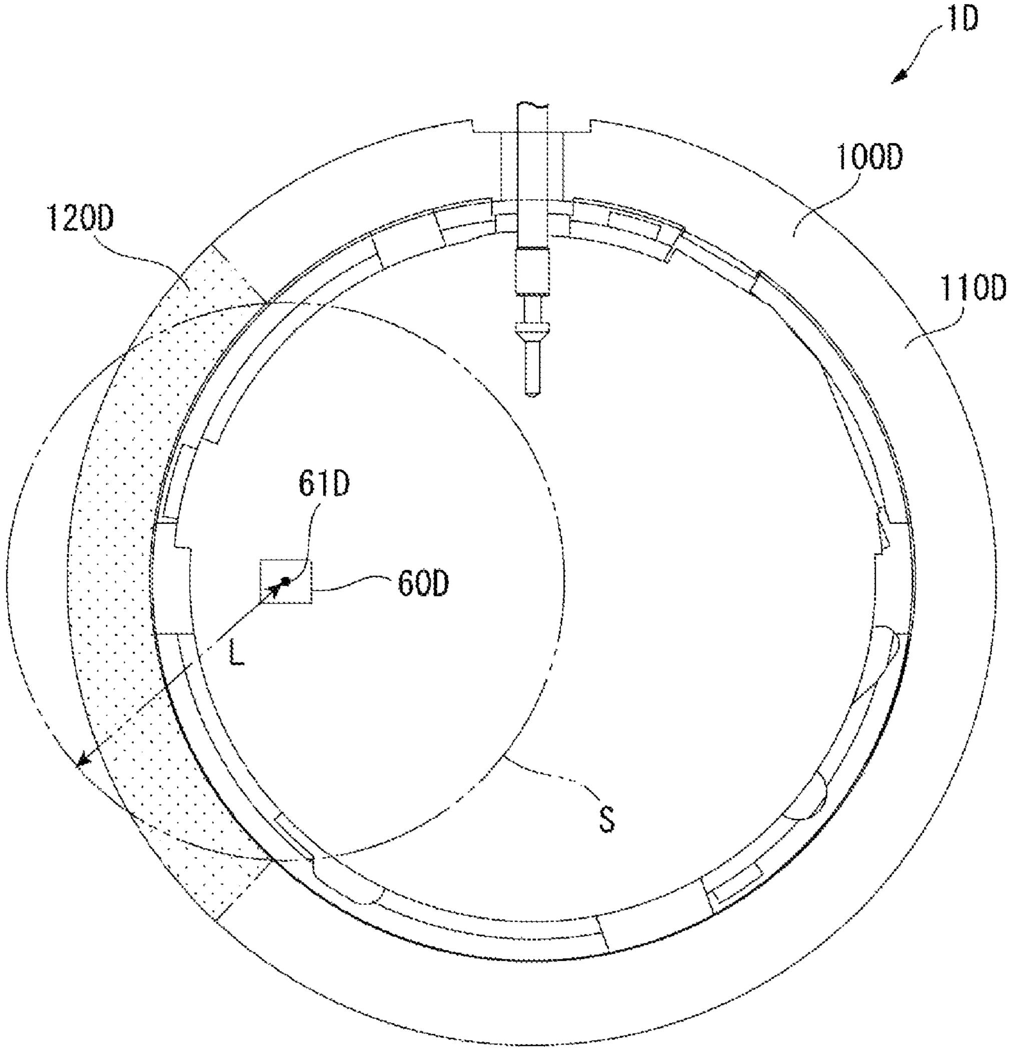
FIG. 11 is a plan view illustrating a main portion of an electronic watch of a fifth embodiment.

FIG. 11 is a plan view illustrating a main portion of an electronic watch 1D of the fifth embodiment. Specifically, the plan view illustrates a main portion of the electronic watch 1D in the state where the cover glass 11 and the dial 2 illustrated in FIG. 1 are removed.

As illustrated in FIG. 11, the electronic watch 1D includes the magnetic sensor 60D in the case body 100D.

In this embodiment, the magnetic sensor 60D is disposed at the 12 o'clock position. In addition, the magnetic sensor 60D is a triaxial magnetic sensor, and is configured to be able to detect the geomagnetism of the vertical component in addition to the horizontal component.

The case body 100D includes the first region 110D and a second region 120D.

As in the above-described first embodiment, the first region 110D includes a first soft magnetic layer, a first non-magnetic layer, and a first mixed layer.

The second region 120D includes a second non-magnetic layer as in the above-described first embodiment.

Here, in plan view, the first region 110D is not disposed at least in a range of the inside of a circle S having a radius L centered on the center 61D of the magnetic sensor 60D in this embodiment as illustrated in FIG. 11. In other words, in plan view, the second region 120D is disposed in a range where the inside of the circle S and the case body 100D overlap each other. More specifically, the second region 120D is defined by a virtual line extending from the intersection point between the inner edge of the case body 100D and the circle S in a direction orthogonal to a tangent to the inner edge of the case body 100D at the intersection point. Note that the range inside the circle S is an example of the predetermined range of the present disclosure.

In this manner, the magnetic sensor 60D and the first region 110D are disposed at a predetermined distance from each other, and thus, when measuring the geomagnetism using the magnetic sensor 60D, absorption of the geomagnetism at the ferrite phase of the first region 110D can be suppressed. In this manner, the measurement accuracy of the geomagnetism at the magnetic sensor 60D can be improved.

Note that in this embodiment, the radius L is set to 15 mm in consideration of the influence of the ferrite phase of the first region 110D on the measurement of the magnetic sensor 60D.

Advantageous Effects of Fifth Embodiment

According to the fifth embodiment, the following effects can be achieved.

In this embodiment, in the case body 100D, the first region 110D is not disposed at least in a predetermined range from the center 61D of the magnetic sensor 60D. Specifically, the first region 110D is not disposed in a range inside the circle S having a radius of 15 mm centered on the center 61D of the magnetic sensor 60D in plan view.

In this manner, the measurement accuracy of the geomagnetism at the magnetic sensor 60D can be improved.

Modification Example

Note that the present disclosure is not limited to the above-described embodiments, and variations, modifications, and the like may be made within the scope in which the object of the present disclosure can be achieved.

In the above-described embodiments, the watch component of the present disclosure is configured as the case bodies 100, 100A, 100B, 100C and 100D, but this is not limitative. For example, the watch component of the present disclosure may be configured as at least one of a case back, a dial, a bezel, a dial ring, and a main plate of a movement. In addition, the electronic watch may include a plurality of the above-described watch components.

In the third embodiment, the thickness e of the first non-magnetic layer 112B provided on the first surface 101 side is greater than the thickness f of the first non-magnetic layer 112B provided on the second surface 102 side, but this is not limitative. For example, it is possible to adopt a configuration in which the first non-magnetic layer 112B and the first mixed layer 113B on the second surface 102 side are not provided. Specifically, it is possible to adopt a configuration in which the first non-magnetic layer 112B and the first mixed layer 113B on the second surface 102 side are removed by cutting such that the first soft magnetic layer 111B is exposed. With such a configuration, a motor and the like can be disposed near the ferrite phase, and thus the magnetic resistance can be further improved.

In the above-described embodiments, the antenna 20 is configured as a bar antenna in which the coil winding of the antenna core 21 is formed in a straight-line shape, but this is not limitative. For example, the antenna may be formed in an arc shape. In this case, the axial direction of the antenna is the tangent direction of the end portion of the antenna 20.

In the above-described embodiments, the antenna 20 is configured as a coil antenna, but this is not limitative. For example, the antenna may be configured as a planar antenna or a monopole antenna.

In the above-described embodiments, the electronic watch 1 is configured as a radio watch that receives the long-wavelength standard radio wave to adjust the time, but this is not limitative. For example, the electronic watch may be configured as a so-called GPS watch configured to be able to receive radio waves from a GPS satellite.

In the above-described embodiments, the case bodies 100, 100A, 100B, 100C and 100D are configured as a watch component, but this is not limitative. For example, it may be configured as a case of an electronic device other than a watch, i.e., a component of an electronic device such as a housing. With a housing having such a configuration, the electronic device can achieve both the improvement in radio wave reception sensitivity and the improvement in magnetic resistance, and can reduce the number of components.

Overview of Present Disclosure

A watch component of the present disclosure includes a first region including a first soft magnetic layer composed of a ferrite phase, a first non-magnetic layer composed of an austenized phase in which the ferrite phase is austenized, and a first mixed layer in which the ferrite phase and the austenized phase are mixed, the first mixed layer being formed between the first soft magnetic layer and the first non-magnetic layer, and a second region including a second non-magnetic layer composed of the austenized phase, the second non-magnetic layer having a thickness greater than that of the first non-magnetic layer.

In this manner, in the second region, the thickness of the second non-magnetic layer composed of the austenized phase capable of transmitting radio waves can be increased, and thus transmission of radio waves such as a long-wavelength standard radio wave can be facilitated.

In addition, since the first region includes the first soft magnetic layer composed of the ferrite phase, magnetic resistance can be achieved. That is, with the watch component of the present disclosure, both the improvement in radio wave reception sensitivity and the improvement in magnetic resistance can be achieved with only a single component and the need for a magnetic shield plate and the like can be eliminated, and thus, the number of components can be reduced.

In the watch component of the present disclosure, the second region may include a second soft magnetic layer composed of the ferrite phase, and a second mixed layer in which the ferrite phase and the austenized phase are mixed, the second mixed layer being formed between the second soft magnetic layer and the second non-magnetic layer.

In this manner, when the second non-magnetic layer is formed by the nitrogen absorption treatment, the entry depth of nitrogen can be reduced, and thus the treatment time of the nitrogen absorption treatment can be reduced.

In the watch component of the present disclosure, a thickness of a combination of the second soft magnetic layer and the second mixed layer may be 100 μm or smaller.

In this manner, the influence on the reception sensitivity of the antenna housed in the watch component can be reduced, for example.

In the watch component of the present disclosure, a thickness of the first soft magnetic layer may be 100 μm or greater.

In this manner, in the first region, a predetermined magnetic resistance required as a watch can be achieved.

In the watch component of the present disclosure, the first region may include a first surface and a second surface located opposite the first surface, the first non-magnetic layer and the first mixed layer may be provided on a first surface side and a second surface side with respect to the first soft magnetic layer, and a thickness of the first non-magnetic layer formed on the first surface side may be greater than a thickness of the first non-magnetic layer formed on the second surface side.

In this manner, the hardness and corrosion resistance required as a watch component can be achieved. Further, the inner space of the watch component can be increased. Thus, the degree of freedom of the arrangement of the components such as the motor and the secondary battery housed in the watch component can be increased, and the size of the watch can be reduced, for example.

In the watch component of the present disclosure, a thickness of the first region and a thickness of the second region may be equal to each other.

In this manner, the first region and the second region can be simultaneously cut in the manufacturing process of the watch component, and thus the ease of the manufacturing of the watch component can be increased.

In the watch component of the present disclosure, a thickness of the first region and a thickness of the second region may be different from each other.

In this manner, when the second region is provided in a thickness smaller than that of the first region, attenuation of the radio waves such as the long-wavelength standard radio wave propagating in the second region can be reduced, for example. Thus, the reception sensitivity of the antenna housed in the watch component can be further improved, for example.

In the watch component of the present disclosure, the watch component may be at least one of a case body, a case back, a dial, a bezel, a dial ring, and a main plate of a movement.

An electronic watch of the present disclosure includes the above-mentioned watch component.

The electronic watch of the present disclosure may further include an antenna including an antenna core and a coil wound on the antenna core. In a side view as viewed from an axial direction of the antenna, the second region may be disposed at a position overlapping the antenna.

In this manner, the reception sensitivity of the antenna that receives radio waves such as the long-wavelength standard radio wave transmitted through the second region can be increased.

In the electronic watch of the present disclosure, in the side view, an area of the second region may be larger than a cross-sectional area of the antenna core.

In this manner, the reception sensitivity of the antenna that receives radio waves such as the long-wavelength standard radio wave transmitted through the second region can be increased.

The electronic watch component of the present disclosure may further include a magnetic sensor configured to detect geomagnetism. The first region may not be disposed at least in a predetermined range from a center of the magnetic sensor.

In this manner, the measurement accuracy of the geomagnetism at the magnetic sensor can be improved.

In the electronic watch of the present disclosure, in plan view, the predetermined range may be a range inside a circle centered on the center of the magnetic sensor, the circle having a radius of 15 mm.

In this manner, the measurement accuracy of the geomagnetism at the magnetic sensor can be improved.

What is claimed is:

1. An austenized ferritic stainless steel comprising:
- a first region including
- a first soft magnetic layer composed of a ferrite phase,
- a first non-magnetic layer composed of an austenized phase in which the ferrite phase is austenized, and
- a first mixed layer in which the ferrite phase and the austenized phase are mixed, the first mixed layer being formed between the first soft magnetic layer and the first non-magnetic layer; and
- a second region including a second non-magnetic layer composed of the austenized phase, the second non-magnetic layer having a thickness greater than that of the first non-magnetic layer, and
- wherein in the first region, the first soft magnetic layer is thicker than the first mixed layer.

2. The austenized ferritic stainless steel according to claim 1, wherein the second region includes
- a second soft magnetic layer composed of the ferrite phase; and
- a second mixed layer in which the ferrite phase and the austenized phase are mixed, the second mixed layer being formed between the second soft magnetic layer and the second non-magnetic layer.

3. The austenized ferritic stainless steel according to claim 2, wherein a thickness of a combination of the second soft magnetic layer and the second mixed layer is 100 μm or smaller.

4. The austenized ferritic stainless steel according to claim 1, wherein a thickness of the first soft magnetic layer is 100 μm or greater.

5. The austenized ferritic stainless steel according to claim 1, wherein
- the first region includes a first surface and a second surface located opposite the first surface;
- the first non-magnetic layer and the first mixed layer are provided on a first surface side and a second surface side with respect to the first soft magnetic layer; and
- a thickness of the first non-magnetic layer formed on the first surface side is greater than a thickness of the first non-magnetic layer formed on the second surface side.

6. The austenized ferritic stainless steel according to claim 1, wherein a thickness of the first region and a thickness of the second region are equal to each other.

7. The austenized ferritic stainless steel according to claim 1, wherein a thickness of the first region and a thickness of the second region are different from each other.

8. A watch component comprising the austenized ferritic stainless steel according to claim 1, wherein the watch component is at least one of a case body, a case back, a dial, a bezel, a dial ring, and a main plate of a movement.

9. A watch component comprising the austenized ferritic stainless steel according to claim 1.

10. An electronic watch comprising the watch component according to claim 9, comprising an antenna including an antenna core and a coil wound on the antenna core, wherein
- in a side view as viewed from an axial direction of the antenna, the second region is disposed at a position overlapping the antenna.

11. The electronic watch according to claim 10, wherein in the side view, an area of the second region is larger than a cross-sectional area of the antenna core.

12. The electronic watch according to claim 10, comprising a magnetic sensor configured to detect geomagnetism, wherein
- the first region is not disposed at least in a predetermined range from a center of the magnetic sensor.

13. The electronic watch according to claim 12, wherein the predetermined range is a range inside a circle centered on the center of the magnetic sensor in plan view, the circle having a radius of 15 mm.

* * * * *